United States Patent
Cohn et al.

(10) Patent No.: US 7,895,545 B2
(45) Date of Patent: Feb. 22, 2011

(54) METHODS FOR DESIGNING A PRODUCT CHIP A PRIORI FOR DESIGN SUBSETTING, FEATURE ANALYSIS, AND YIELD LEARNING

(75) Inventors: John M. Cohn, Richmond, VT (US); Leah M. Pastel, Essex Junction, VT (US); Gustavo E. Tellez, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 401 days.

(21) Appl. No.: 12/103,217

(22) Filed: Apr. 15, 2008

(65) Prior Publication Data
US 2009/0259983 A1 Oct. 15, 2009

(51) Int. Cl.
*G06F 17/50* (2006.01)
(52) U.S. Cl. ............................... 716/13; 716/1; 716/12; 716/14
(58) Field of Classification Search ...... 716/1, 716/12, 13, 14
See application file for complete search history.

(56) References Cited

U.S. PATENT DOCUMENTS

| | | | |
|---|---|---|---|
| 7,194,706 B2* | 3/2007 | Adkisson et al. | 716/4 |
| 2004/0025123 A1* | 2/2004 | Angilivelil | 716/4 |
| 2005/0081130 A1* | 4/2005 | Rinderknecht et al. | 714/726 |
| 2006/0259885 A1* | 11/2006 | Mortensen et al. | 716/7 |
| 2007/0099236 A1 | 5/2007 | Bickford et al. | |
| 2007/0136714 A1 | 6/2007 | Cohn et al. | |
| 2009/0132976 A1* | 5/2009 | Desineni et al. | 716/5 |

* cited by examiner

*Primary Examiner*—Jack Chiang
*Assistant Examiner*—Magid Y Dimyan
(74) *Attorney, Agent, or Firm*—Wood, Herron & Evans, LLP

(57) ABSTRACT

A method for designing a chip a priori for design subsetting, feature analysis, and yield learning. The method includes identifying a plurality of signal paths within a chip design that can be readily identified from chip fail data and removing a fraction of the plurality of signal paths that have physical design constraints to generate a subset of the plurality of signal paths. The method further includes constructing a physical implementation of each of the signal paths in the subset, identifying one or more signal paths in the subset that are not constructed consistently with the respective physical implementation, and removing those signal paths from the subset.

8 Claims, 3 Drawing Sheets

METHODS FOR DESIGNING A PRODUCT CHIP A PRIORI FOR DESIGN SUBSETTING, FEATURE ANALYSIS, AND YIELD LEARNING

FIELD OF THE INVENTION

The invention relates generally to the electronic design of integrated circuits and, in particular, to methods of yield learning used to detect and localize defects during fabrication of integrated circuits.

BACKGROUND OF THE INVENTION

Designing and fabricating integrated circuits is a complex process that involves many discrete steps. A design specification is modeled logically, typically in a hardware design language (HDL). Software simulation and hardware emulation tools are used to verify the design logic. The design is converted into a technology specific netlist and is floor-planned and wired using physical design place and routing tools. Once the physical design has been completed and formatted correctly, the appropriate masks are created to fabricate the design as integrated circuits or a chip on a wafer.

Defects of various types occur during the chip manufacturing process. A defect may be simply a flaw in the chip caused by sources of imperfection inherent in the manufacturing process, or it may be caused by a systematic interaction between process and design. Failure analysis is often used to determine the root cause or defect mechanism, so that the manufacturing process or the design can be corrected to reduce yield loss.

In-line testing and inspection are performed during the chip manufacturing process with the goal of detecting defects and identifying the sources of these detected defects as close to real time as possible. A common type of in-line testing is a kerf test, which involves testing integrated circuit structures built in the kerf area between the chips on the wafer. If sufficient defective test structures are detected on a wafer, the entire wafer may be scraped or, alternatively, may be subjected to physical failure analysis for yield learning. One disadvantage of relying on kerf structures for yield learning is that these structures consume wafer surface area that would otherwise be available for chip fabrication. Other disadvantages of relying solely on kerf structures are that kerf structures may not have sufficient critical area to detect defects within test time constraints, and that kerf structures fail to contain as much layout design variety as product chips. Other vehicles for in-line testing include testsites and short loop wafers.

Wafer testing, also known as wafer final test, is performed after integrated circuits have been manufactured. Test patterns are applied to confirm that logic and memory elements have been fabricated correctly. Tests may be applied to confirm that specific functions operate correctly within specifications. Chip designs may include specific monitoring circuitry, such as wired out devices or on-chip performance screen ring oscillators. When all necessary tests pass for a specific chip on a wafer, the chip's spatial location on the wafer is stored for dispositioning. If a specific chip fails necessary testing and lacks sufficient redundancy to compensate for the fail, the chip is considered faulty and may be discarded. These chips represent the significant time and cost investment incurred in their manufacture. Additionally, these chips have captured defects, that if understood, could be used to improve yield.

Accordingly, there is a need for a method to design and build chip hardware that can be used to detect and localize defects in integrated circuits at the chip level.

SUMMARY OF THE INVENTION

In an embodiment of the invention, a method is provided for designing an integrated circuit. The method includes identifying a plurality of signal paths within a chip design that can readily be identified from chip fail data and removing a fraction of the plurality of signal paths that have physical design constraints to generate a subset of the plurality of signal paths. The method further includes constructing a physical implementation of each of the signal paths in the subset, identifying one or more signal paths in the subset with physical implementations that do not meet the construction criteria, and removing the one or more non-compliant signal paths from the subset.

DETAILED DESCRIPTION

Figure 1:
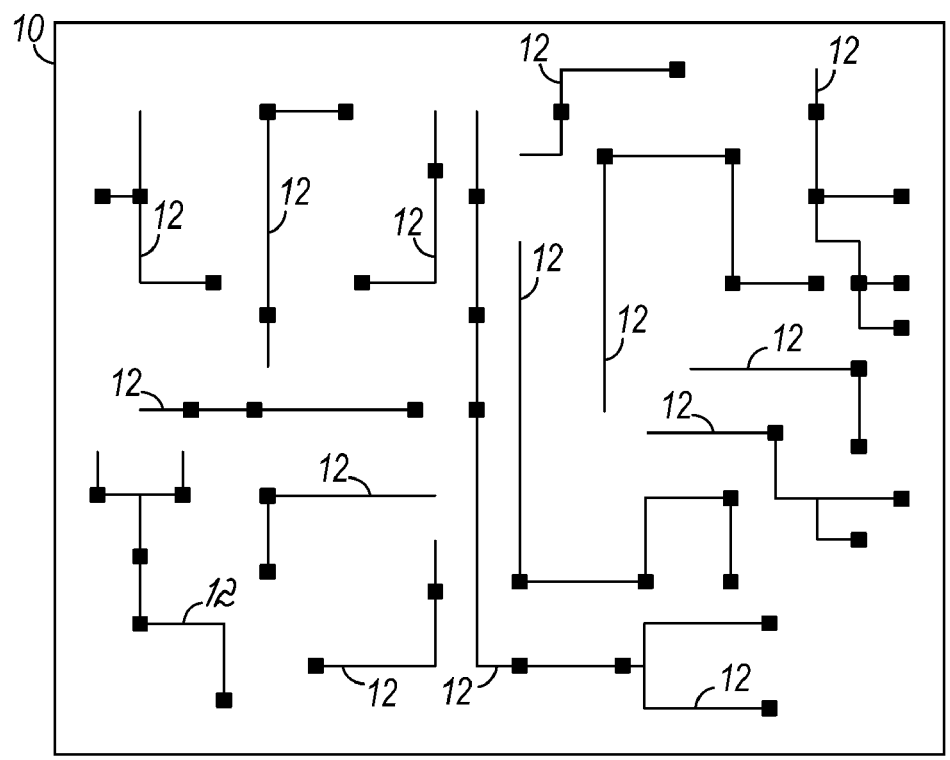
FIG. 1 is a schematic representation illustrating multiple signal paths within an integrated circuit.

With reference to FIG. 1, a chip 10 includes a particular integrated circuit with a unique arrangement of features (i.e., layout). Within the layout, a plurality of signal paths 12 can be identified that consist of circuit elements and wiring that connects the circuit elements. Each of the signal paths 12 originates at one or more input points for launching a test pattern to propagate through the signal path 12 and terminates at one or more output points for collecting the test pattern after propagation through the signal path 12. Each of the signal paths may be complete, such as from an I/O to another I/O or from one scan latch to another scan latch. Alternatively, each of the signal paths may be partial, such as from an internal point in the chip design to a scan latch.

Figure 4:
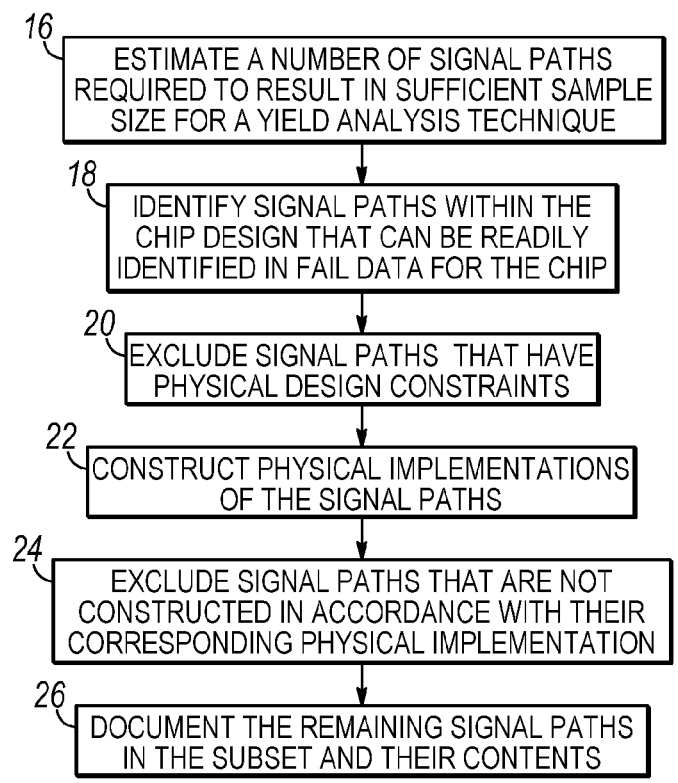
FIG. 4 is a diagrammatic view of a method of designing a product chip a priori for design subsetting, feature analysis, and yield learning in accordance with an embodiment of the invention.

With reference to FIG. 4 and in accordance with an embodiment of the invention, a number of signal paths is estimated that will provide a sufficient sample size for a given yield analysis technique in block 16. The specific number, N, of signal paths 12 in the subset of the total number of signal paths 12 will be based upon at least one of the particular chip design, the predicted yield, critical areas, or feature counts. Yield pertains to a ratio of the number of passing chips on a processed wafer to the total number of chips tested on the processed wafer. Various yield prediction models may be used to predict a defect distribution during critical masking steps. The critical areas reflect the sensitivity or susceptibility of a particular chip design to random particle defects occur-ring during the process of manufacturing the wafer and are produced by a critical area analysis. Features in the physical design, such as, for example, minimum spaced shapes or single vias, can be identified and counted using software tools that process layout shapes data, such as ground rule checking tools.

In block 18, given a chip netlist, a portion of the signal paths 12 are identified within the chip design that can be readily identified from chip fail data. In one embodiment, the fail data for the chip 10 is collected using an automated tester that is configured to apply a test pattern as a stimulus at an input point to each signal path, propagate the test pattern along the signal path, and read the resultant test pattern at the observation point of the signal path as a response to the stimulus. The tester compares the read test pattern from each signal path that is being tested to the expected test pattern, which corresponds to the test pattern output by the signal path if the circuitry were operating properly. When the read and expected test pattern match, the circuitry in the signal path is considered to be functioning normally because it does not contain any of the faults for which it was tested. If the read test pattern fails to match the expected test pattern, the circuitry in the signal path that provided the read test pattern is not performing properly and is considered to fail the logic test. The fail data may be mapped to the critical area and features corresponding to the specific fail on the chip 10. In various different embodiments, fail data may be mapped using simulation or dictionary schemes, or be implied due to the nature of the path selection.

Figure 2:
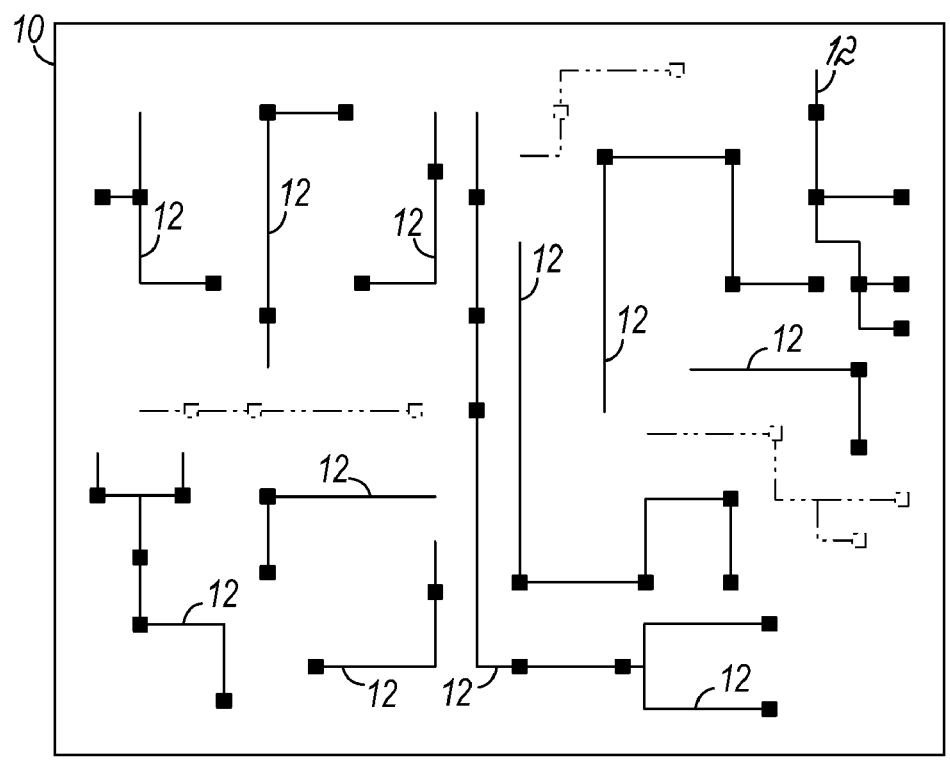
FIG. 2 is a schematic representation similar to FIG. 1 in which signal paths having physical design constraints are discarded from the subset.

In block 20, of the group of signal paths 12 identified in block 18, signal paths are identified that do not have physical design constraints, as illustrated in FIG. 2, and collected into a first subset. Physical design constraints include, but are not limited to, timing constraints or current matching constraints. Those signal paths 12 subject to physical design constraints are removed from the first subset.

In block 22, a particular desired distribution, range, limit, or feature content is specified for the chip at an appropriate point in the physical design process. Targeted physical implementations of the potential subset of signal paths 12 are constructed from the desired distribution, range, limit, or feature content specified for the chip 10. Some of these signal paths 12 may not be constructed as desired because of previously placed and routed chip elements.

Figure 3:
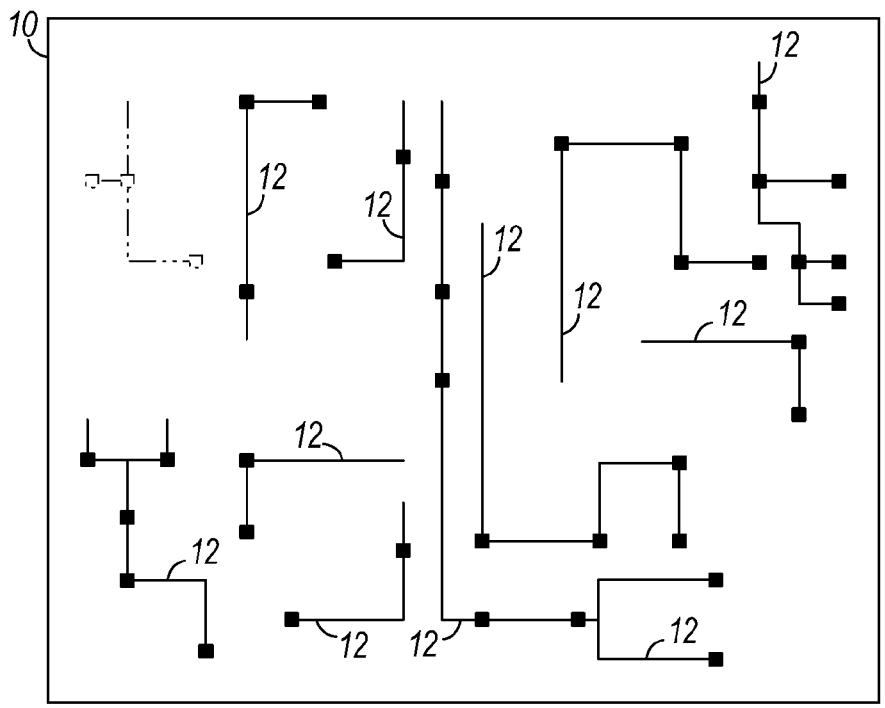
FIG. 3 is a schematic representation similar to FIG. 2 in which signal paths are discarded from the subset that do not meet the construction criteria for the targeted physical implementations.

In block 24, with each signal path 12 or group of signal paths 12, a determination is made whether each of the signal paths 12 was constructed in accordance with the targeted physical implementations. Signal paths 12 that do not meet the construction criteria set forth in the physical implementations are removed from the subset, as depicted in FIG. 3. The remaining subset of signal paths 12 meeting the given requirements of the respective targeted physical implementations is deemed the path subset. The steps in block 22 and 24 may be performed iteratively and stop after a sufficient number of subset paths are identified that have been constructed with targeted physical implementations and before all of the signal paths in the subset are physically implemented. Alternatively, all of the signal paths in the subset may be physically implemented before compliance of the content of the signal paths with the respective targeted physical implementation is determined.

In block 26, the paths 12 in the path subset that are compliant with the targeted physical implementation and the contents of each of the signal paths 12 is documented and used for yield learning during chip fabrication. The yield analysis technique may utilize fail rates of the signal paths 12 in the final subset of paths to analyze defect presence and to identify systematics in yield loss. Feedback from these analyses may be used to modify chip designs, target in-line inspection, generate inspection recipes, change process, or monitor defects, which may eliminate or reduce the frequency of the fails for the various paths and improve fabricator yield. The step in block 26 may be implicit in the design data. A software tool may be written to extract the subset from the design data based on physical construction criteria or based upon path selection criteria.

In a specific embodiment of the invention, one particular embodiment of the methodology is to operate as a back-end-of-line (BEOL) process monitor. Each path to be wired is designed such that the functionality of each path can be deconvolved to monitor the health of the target wiring levels and to identify atypical fail rates caused by BEOL yield detractors.

Figure 5:
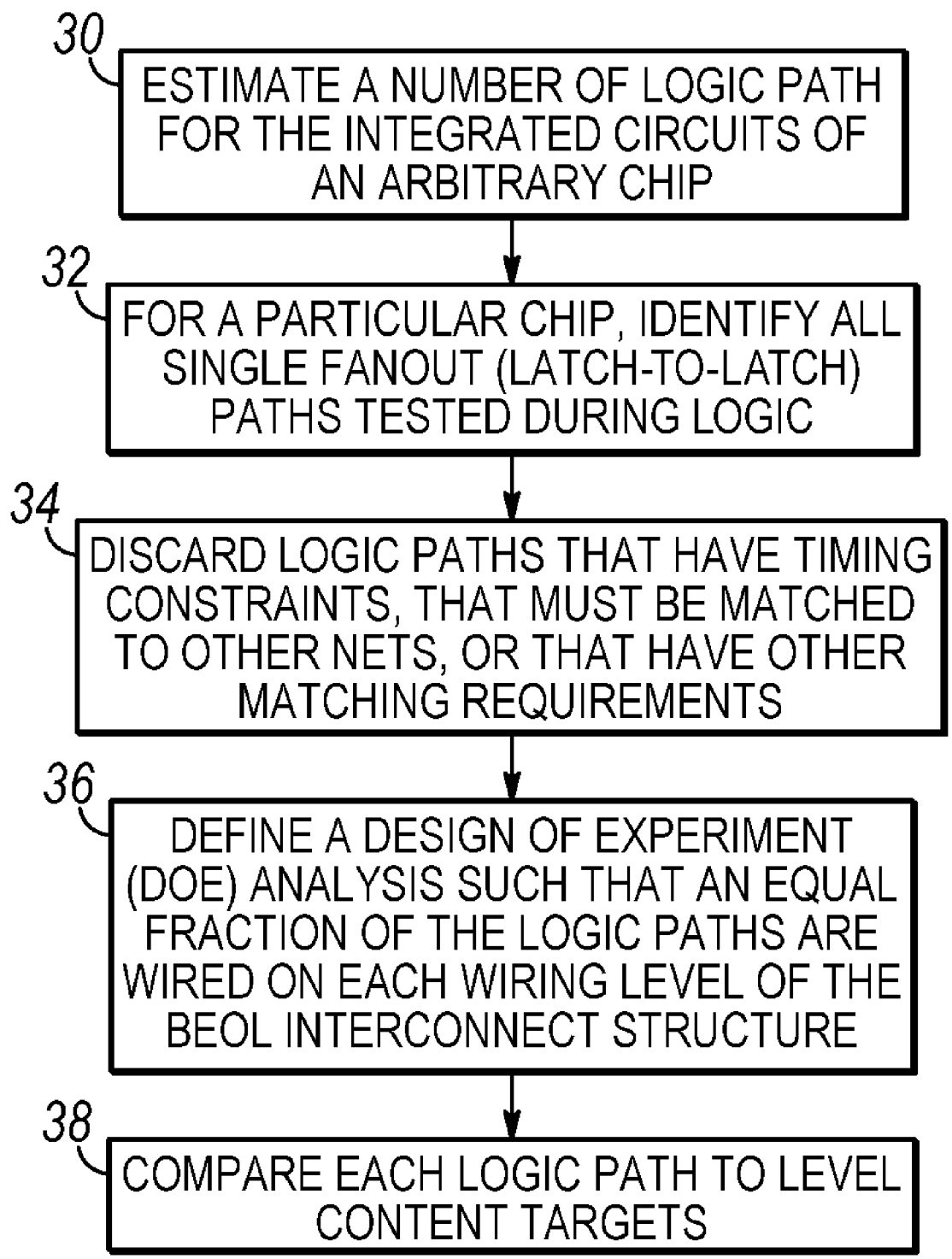
FIG. 5 is a diagrammatic view of a method of designing a product chip a priori for design subsetting, feature analysis, and yield learning in accordance with another embodiment of the invention.

With reference to FIG. 5 and in accordance with an alternative embodiment of the invention, an estimated number of logic paths is defined in block 30 for the integrated circuits of an arbitrary chip. The estimated number of logic paths provides a sample size sufficient for a given yield analysis technique. To route the logic paths, a design of experiments (DOE) analysis of the BEOL path contents may be used to identify specific BEOL yield detractors in the wiring levels.

In block 32, for a particular chip design, all single fanout (latch-to-latch) paths tested during logic test are identified in an initial subset of paths. A one-to-one correspondence exists between the path and the failing latch during logic test. A representative single fanout path is a logic path that goes from a latch through a series of buffers to another latch.

In block 34, of the logic paths identified in block 32, logic paths are discarded that have timing constraints, that must be matched to other nets, such as logic paths in a data bus, or that have other matching requirements. The remaining logic paths may be constructed "randomly" within a relatively wide timing window. This action reduces the number of logic paths in the subset.

In block 36, the design of experiment (DOE) analysis is defined such that an equal fraction of the logic paths in the subset are wired on each wiring plane or level of the BEOL interconnect structure. For example, assuming that the chip design includes six wiring levels, the design of experiment (DOE) analysis may be defined such that one-fourth (i.e., N/4) of the logic paths are wired on each pair of wiring levels (M2/M3, M3/M4, M4/M5, M5/M6). The local interconnect (M1) wiring level is not targeted in the experiment because the M1 wiring level, which is used for local wiring connection, tends to be fully populated. The M2 wiring level may also be too highly populated to permit construction of the desired number of logic paths on the M2/M3 pair.

In block 38, each logic path in the subset is compared to targets for the wiring level content. The distribution for groups of logic paths may also be compared to target length averages for each wiring level and variations based on the Design of Experiments analysis. The logic paths are then used in the Design of Experiments analysis to identify yield detractors in the different wiring levels. The design of experiment (DOE) analysis represents a structured, organized method for determining the relationship between factors affecting a process and the output of that process to identify the yield detractors.

While the invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art.

Thus, the invention in its broader aspects is therefore not limited to the specific details, representative apparatus and method, and illustrative example shown and described. Accordingly, departures may be made from such details without departing from the spirit or scope of applicants' general inventive concept.

What is claimed is:

1. A method of designing a product chip, the method comprising:
   (a) using an automated tester to identify a plurality of signal paths within a chip design that can be readily identified from chip fail data;
   (b) using a software tool to remove a fraction of the signal paths that have physical design constraints to generate a subset of the signal paths;
   (c) constructing a physical implementation of the signal paths in the subset with the software tool by selecting an equal number of logic paths wired on each of a plurality of adjacent pairs of a plurality of wiring levels in a back-end-of-line (BEOL) interconnect structure;
   (d) identifying with the software tool one or more signal paths in the subset that are not constructed with the respective targeted physical implementation;
   (e) discarding the one or more signal paths from the subset that are not constructed with the respective targeted physical implementation; and
   (f) using the subset in a design of experiment (DOE) analysis with the software tool to identify yield detractors in the plurality of wiring levels of the back-end-of-line (BEOL) interconnect structure.

2. The method of claim 1 further comprising:
   estimating a number of signal paths that will establish a sufficient sample size for a given yield analysis technique.

3. The method of claim 2 wherein the number of signal paths is based upon at least one of the chip design, a predicted yield, critical areas, or feature counts.

4. The method of claim 2 further comprising:
   iterating steps (c), (d), and (e) until the subset is populated with the number of test paths estimated to establish the sufficient sample size.

5. The method of claim 1 wherein the physical implementation is constructed for all of the signal paths before the one or more signal paths are identified that are not constructed consistently with the respective targeted physical implementation and discarded from the subset.

6. The method of claim 1 further comprising:
   documenting each of the one or more signal paths in the subset; and
   documenting a feature content of each of the one or more signal paths in the subset.

7. The method of claim 1 further comprising:
   modifying the chip design based on the subset.

8. The method of claim 1 wherein identifying one or more of signal paths within the chip design further comprises:
   identifying a plurality of single fanout paths tested during a logic test.

* * * * *